United States Patent [19]

Aucktor

[11] 4,392,839
[45] Jul. 12, 1983

[54] DRIVE SHAFT CONSTRUCTION

[75] Inventor: Erich Aucktor, Offenbach am Main, Fed. Rep. of Germany

[73] Assignee: Löhr & Bromkamp GmbH, Offenbach am Main, Fed. Rep. of Germany

[21] Appl. No.: 238,446

[22] Filed: Feb. 26, 1981

[30] Foreign Application Priority Data

Mar. 11, 1980 [DE] Fed. Rep. of Germany ....... 3009277

[51] Int. Cl.³ .............................................. F16C 3/00
[52] U.S. Cl. ...................................... 464/183; 464/182
[58] Field of Search ............... 464/179, 180, 182, 181, 464/183

[56] References Cited

U.S. PATENT DOCUMENTS 733,222   7/1903  Liebert et al. .................. 464/183 X
1,700,867  2/1929  Wolfe ................................. 464/183
4,127,080 11/1978  Lakiza et al. .................. 464/183 X
4,214,457  7/1980  Wade et al. .................... 464/183 X

FOREIGN PATENT DOCUMENTS 2135909  1/1973  Fed. Rep. of Germany .

*Primary Examiner*—John Petrakes
*Attorney, Agent, or Firm*—Toren, McGeady and Stanger

[57] ABSTRACT

A drive shaft construction particularly for a motor vehicle including a hollow tubular shaft having a pair of end portions formed with a splined configuration adapted to receive driving joints is structured so that the tubular shaft is formed with an intermediate portion having an outer diameter greater than the outer diameter of the end portions, with the wall thickness of the intermediate portion being between $\frac{1}{8}$ and 1/15 of the outer diameter of the intermediate portions.

2 Claims, 3 Drawing Figures

DRIVE SHAFT CONSTRUCTION

The present invention relates generally to a drive shaft construction for driving motor vehicles and more particularly to a construction including a tubular shaft having ends designed as splined hollow portions for receiving driving joints.

Drive shafts of the type to which the present invention relates are usually required to be lightweight and capable of transmitting high torques. Furthermore, they must be capable of being produced at reasonable cost.

A drive shaft of this type is known from German Auslegeschrift No. 21 35 909 wherein the tubular shaft is hollow across the entire length thereof. However, the outer diameter of both the tubular shaft and the joint receiving portions is constant. When dimensioning such tubular shafts, provision must be made for a certain wall thickness to permit torque to be transmitted, or for the receiving portions to be enlarged to permit the use of joints with a greater rotation diameter. Both measures result in an increase in weight. From the point of view of production, such drive shafts have the disadvantage in that they can only be machined by chip forming processes.

It is therefore the purpose of the invention to provide a splined shaft with cross-sections of the same strength which can be produced by non-chip-forming processes, with the driving joints having the smallest possible receiving diameters, so that joints with a smaller rotation diameter can be used.

SUMMARY OF THE INVENTION

Briefly, the present invention may be described as a drive shaft construction wherein the tubular shaft is formed with an intermediate portion between the joint-receiving ends thereof which has a wall thickness of between $\frac{1}{8}$ to 1/15 the outer diameter of the intermediate portion, with the outer diameter of the intermediate portion being greater than that of the joint-receiving portions.

The advantage of such a design is that as a result of the large outer diameter of the intermediate portion of the tubular shaft, the wall thickness can be kept very small. As the receiving portions, in their diameter, are smaller than the intermediate portion of the shaft, it is possible to use driving joints whose torque capacities correspond to the type of application involved. In such a case, there is no need to take into account the inner diameter of the inner joint body which must be nonrotatively connected to the tubular shaft. The required torsional strength, even of a small diameter shaft end, is achieved by a greater wall thickness and by a sufficient hardening depth.

In addition, if the space available for assembly is limited, provision can be made for the tubular shaft to have at least two steps, with the wall thicknesses of the areas with the greater diameter being smaller than those of the areas with the smaller diameter. By providing such embodiments with such graduations in the size of the diameter, the problem of space required for assembly purposes can be solved.

In order to avoid unnecessarily large quantities of lubricants in the joint interior, a further characteristic of the invention provides for the hollow openings of the receiving portions to be closed, for example by means of a plug or the like.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
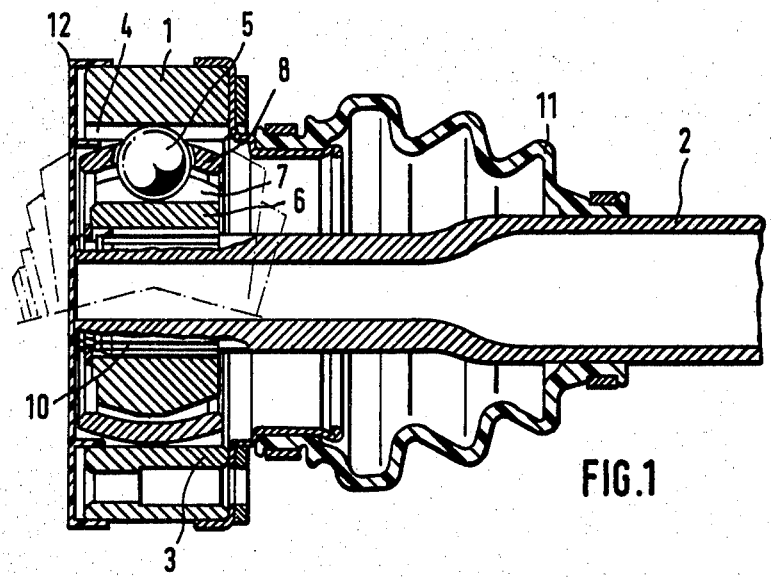
FIG. 1 is a sectional view of half a drive shaft construction in accordance with the present invention showing one of two ends thereof.

A drive shaft construction accroding to the invention is shown in FIG. 1 which consists of two rotary CV joints 1, only one of which is shown. For the sake of simplicity, only one half of the drive shaft is illustrated. A hollow tubular shaft 2 serves to connect the two rotary CV joints.

The rotary CV joint 1 consists of an outer joint body 3 having a cylindrical cavity within which there are provided grooves 4 for accommodating balls 5. The inner cavity of the body 3 contains an inner joint body 6 with a number of grooves 7 corresponding to that of the outer joint body 3.

A groove 7 of the inner joint body 6 always intersects with a groove 4 of the outer joint body 3 and accommodates a ball 5 which is necessary for the transmission of torque. The balls 5 are guided in windows of a cage 8 arranged between the inner joint body 6 and the outer joint body 3. In the case of this joint, the cage 8, with its outer ball face, is guided on the inner face of the outer joint body 3. The two joint bodies 3 and 6 are slidable relative to each other in an axial direction.

The tubular shaft 2 is provided at each end with a stub 9 having an outer splined profile 10 which is accommodated in the corresponding bore of the inner joint body 6. Penetration of dirt, dust or water is prevented by bellows 11 at one end and by a sealing cap 12 at the other end. Instead of the described VL joint, it is also possible to use a joint of a different design such as an RF joint, DO joint or a Tripode joint.

Figure 2:
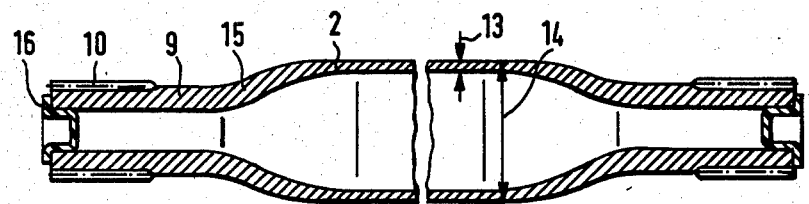
FIG. 2 is a sectional view showing as an individual component a tubular shaft according to the invention.

FIG. 2 shows the tubular shaft 2 as an individual component. The shaft 2 is hollow across its entire length, including the stubs 9. The shaft 2 is formed with a portion intermediate its end portions or stubs 9 having a maximum wall thickness 13 which is $\frac{1}{8}$ of the value of the outer diameter 14 of the intermediate portion of the shaft 2.

From the greatest outer diameter 14 of the shaft 2 towards the stub 9, provision is made for a transition portion or step 15, with the wall thickness in the area of the stub 9 being greater than the wall thickness 13. For accommodating the inner joint body 6, the stub 9 has a splined profile 10 produced by non-chip-forming processes. The open ends of the shaft 2 are sealed by plugs 16, so that lubricant in the interior of the joint cannot escape into the interior of the tubular shaft 2.

In accordance with the invention, the portion of the tubular shaft 2 intermediate the end portions or stubs 9 may be formed with a wall thickness 13 which is between 1/8 and 1/15 the outer diameter 14 thereof.

Furthermore, the transition portions between the stubs 9 and the intermediate portion is formed with a wall thickness which increases from the greater-diameter intermediate portion to the smaller-diameter end portions or stubs 9.

Figure 3:
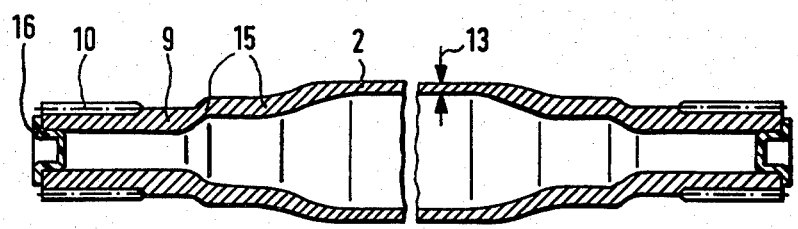
FIG. 3 is a sectional view of a tubular shaft formed with two steps.

In principle, FIG. 3 illustrates the same tubular shaft as shown in FIG. 2, the difference being that provision has been made for two steps 15, so that looking at the arrangement from stub 9, the part with the smaller diameter always has a greater wall thickness than the adjacent part. In the center area or intermediate portion, the shaft 2 has again been provided with a wall thickness 13 which, at its maximum, amounts to 1/8 of the outer diameter 14 of the center portion. This embodiment, too, has a splined profile 10 and a sealing plug 16.

It should be noted that in both the embodiments of FIGS. 2 and 3, the intermediate or center portion has been provided with an outer diameter which is larger than the outer diameter of the stubs 9.

While specific embodiments of the invention have been shown and described in detail to illustrate the application of the inventive principles, it will be understood that the invention may be embodied otherwise without departing from such principles.

What is claimed is:

1. In a drive shaft construction for transmitting power in an automotive vehicle including an integral hollow tubular shaft having a pair of end portions formed with a splined configuration adapted for receiving driving joints, the improvement which comprises:

that said tubular shaft is formed with a portion intermediate said end portions having an outer diameter greater than the outer diameter of said end portions;

that the wall thickness of said intermediate portion is between 1/8 and 1/15 of said outer diameter of said intermediate portion; and that said tubular shaft includes two transition portions extending respectively between said intermediate portion and each of said end portions, said transition portions being formed as stepped configurations each including at least two steps and each having a wall thickness which increases from said larger-diameter intermediate portion to said smaller-diameter end portions.

2. A construction according to claim 1 wherein said end portions are formed with hollow openings, said hollow openings being closed by plug means.

* * * * *